No. 718,397. PATENTED JAN. 13, 1903.
W. SOMMER.
FILTER PRESS.
APPLICATION FILED NOV. 22, 1900.
NO MODEL.
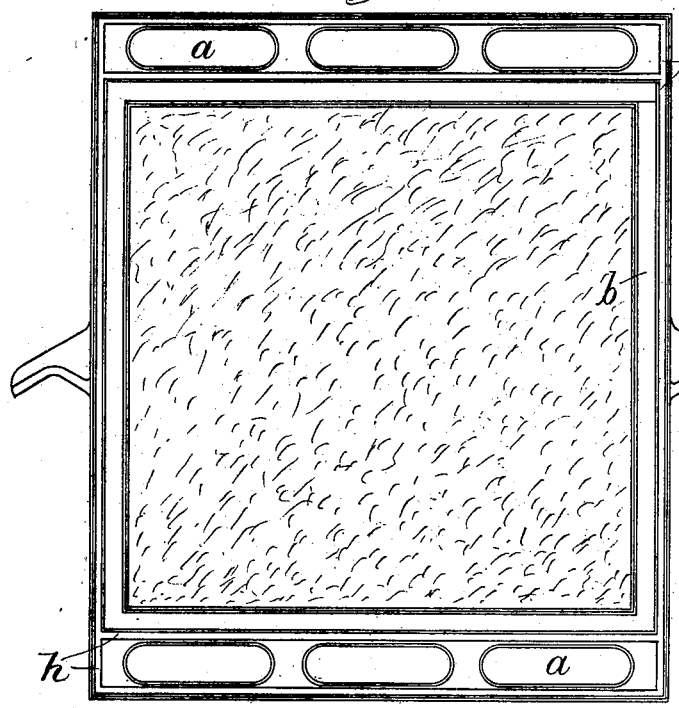
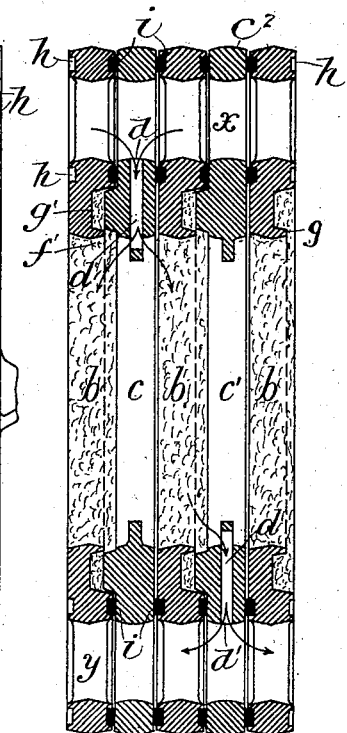
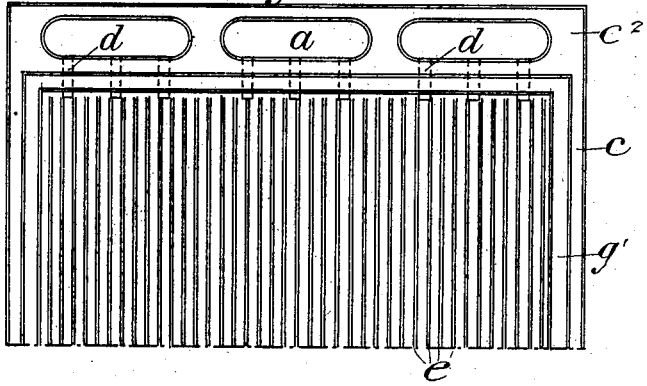
WITNESSES:
INVENTOR
W. Sommer
BY
Edward P. Thompson
ATTORNEY

UNITED STATES PATENT OFFICE.

WILHELM SOMMER, OF FÜRTH, GERMANY, ASSIGNOR TO FILTER-& BRAU-TECHNISCHE MASCHINEN-FABRIK, ACTIEN GESELLSCHAFT, FORMERLY L. A. ENZINGER, OF WORMS, GERMANY, A CORPORATION OF GERMANY.

FILTER-PRESS.

SPECIFICATION forming part of Letters Patent No. 718,397, dated January 13, 1903.

Application filed November 22, 1900. Serial No. 37,357. (No model.)

*To all whom it may concern:*

Be it known that I, WILHELM SOMMER, master brewer, of Fürth, in the Kingdom of Bavaria and Empire of Germany, have invented new and useful Improvements in Filter-Presses, of which the following is a specification.

This invention relates to the construction of filter-presses; and its object is to provide means whereby the filtering-surfaces may be at all times completely covered with the fluid under filtration with a uniformly-constant pressure and without any counter-current.

It consists in a filter formed of a series of flat frames containing filtering material, alternating with a series of grids or open-work structures which support the filter-sheets against the pressure of the fluid and at the same time act as passage-ways for the fluid through the filter.

The invention is illustrated in the accompanying drawings, in which—

Figure 1 is a side view of one of the frames containing the filtering material. Fig. 2 is a similar view of the upper portion of one of the grids forming the passage-ways from and to the filtering material and supporting the latter. Fig. 3 is a vertical cross-section of the filter on an enlarged scale.

The filter is composed of a series of flat frames $b$, of identical form, alternating with a series of grids $c\ c'$, which are also of identical form, the only difference between the grids $c$ and $c'$ being in their arrangement in the filter, grids $c'$ being reversed with respect to the grids $c$, as hereinafter explained. The grids $c$ and $c'$ are formed of an exterior framework $c^2$ and provided with a rectangular opening in the center, across which extend bars $e$ for supporting the filter material against the pressure of the fluid and holding it in place, while at the same time permitting access of the fluid thereto. Filter material $f$ is held clamped in corresponding openings in the frames $b$ by means of shoulders $g$, formed upon the sides of the frames, which coöperate with interlocking shoulders $g'$ upon the frames $c^2$ of the grids $c\ c'$ and hold the material firmly in position, so as to prevent the passage of the unfiltered liquid. Access is had to the interior of the grids $c\ c'$ by a plurality of vertical ports $d\ d'$, formed in one side thereof, the ports $d$ being formed in the upper side of the grids $c$ and the ports $d'$ in the lower side of the grids $c'$. It will be understood that in practice the casting for the grid $c$ is the same as for the grid $c'$, the grid $c$ being merely reversed to form a grid $c'$. In the upper and lower sides of both the grids $c\ c'$ and the frames $b$ are also formed alined transverse openings $a$, which when the frames and grids are assembled, as shown in Fig. 3, coöperate to form continuous passage-ways $x$ and $y$ in the top and bottom of the filter and serving, respectively, as inlets and outlets for the fluid to be filtered. Grooves $h$ are also formed in the frames $b$ to receive packing material $i$ for the prevention of leakage.

In the operation of the invention the unfiltered material will be caused to enter by appropriate connections through the passage-way $x$ and passing through the passage-ways $d$ will enter the interior of the grids $c$ and fill the latter. A steady and uniform pressure will thus be created upon the filter material $f$, and by reason of the narrowness of the space between each pair of plates $b$ eddy or counter currents will be prevented. Thence passing through the filtering material, the fluid will flow down the rear surface of the latter and enter the grids $c'$ and thence, draining through the ports $d'$, may be withdrawn through the outlet-passage $y$.

It will be understood that the grid-bars $e$ may be omitted from the frame $c$ in the front face of the filter-plates without affecting the invention, as the filter-plates would still be held in place by the pressure of the fluid on their faces.

Having thus described my invention, what I claim, and desire to secure by Letters Patent, is—

1. A filter-press comprising a stack of two alternating series of framed filter-plates having central openings therein and other openings at the top and bottom sides thereof combining to form inlet and outlet passages respectively, the first said series being formed with grid-bars across the central opening thereof and a groove about the periphery of said opening, and the second said series having ports communicating alternately with the inlet and outlet passages, and a shoulder interlocking with said grooves about the central aperture thereof, other grooves formed in one of each pair of abutting faces around and between all three sets of openings, packing material lying in said last-mentioned grooves, and sheets of filtering material clamped between said interlocking groove and shoulder.

2. In a filter-press, a plate formed with a central opening and other openings on each side thereof, a port connecting the central opening with the side openings on one side, and a taper shoulder formed around the periphery of said central opening on one face of the plate and adapted to interlock with a corresponding groove formed on the adjacent plate to hold a sheet of filter material.

3. A filter-press comprising a stack of two alternating series of framed filter-plates having central openings therein and other openings forming inlet and outlet passages respectively at the top and bottom sides thereof, the first said series being formed with grid-bars across the central opening thereof and a groove around the periphery of said opening, and the second said series having ports communicating alternately with the inlet and outlet passages, a shoulder interlocking with said groove around the periphery of the central opening thereof, other grooves formed in one of each pair of abutting faces around and between all three sets of openings, packing material lying in the last-mentioned grooves, and sheets of filtering material clamped between said interlocking grooves and shoulders.

In testimony whereof I have hereunto subscribed my name this 11th day of September, 1900.

WILHELM SOMMER. [L. S.]

Witnesses:
JOHANN SCHMIDT,
OSCAR BOCK.